United States Patent
Kim et al.

(10) Patent No.: US 10,494,707 B2
(45) Date of Patent: Dec. 3, 2019

(54) AUSTENITIC-BASED STAINLESS STEEL FOR MOLTEN CARBONATE FUEL CELL

(71) Applicant: POSCO, Pohang-si (KR)

(72) Inventors: Kwang Min Kim, Pohang-si (KR); Jong Hee Kim, Daejeon (KR); Ki Hoon Jo, Pohang-si (KR); Bo Sung Seo, Pohang-si (KR)

(73) Assignee: POSCO, Pohang-si (KR)

(*) Notice: Subject to any disclaimer, the term of this patent is extended or adjusted under 35 U.S.C. 154(b) by 222 days.

(21) Appl. No.: 15/533,570

(22) PCT Filed: Dec. 22, 2015

(86) PCT No.: PCT/KR2015/014087
§ 371 (c)(1),
(2) Date: Jun. 6, 2017

(87) PCT Pub. No.: WO2016/105079
PCT Pub. Date: Jun. 30, 2016

(65) Prior Publication Data
US 2017/0342534 A1 Nov. 30, 2017

(30) Foreign Application Priority Data
Dec. 26, 2014 (KR) .................... 10-2014-0191167

(51) Int. Cl.
*C22C 38/58* (2006.01)
*C22C 38/48* (2006.01)
(Continued)

(52) U.S. Cl.
CPC ............ *C22C 38/58* (2013.01); *C22C 38/001* (2013.01); *C22C 38/02* (2013.01); *C22C 38/48* (2013.01);
(Continued)

(58) Field of Classification Search
CPC ....... C22C 38/58; C22C 38/001; C22C 38/02; C22C 38/48; C22C 38/54
See application file for complete search history.

(56) References Cited

U.S. PATENT DOCUMENTS 5,565,167 A 10/1996 Fujimoto et al.
5,989,740 A * 11/1999 Tomimatsu ............ H01M 8/02
429/478

FOREIGN PATENT DOCUMENTS

CN 103476959 12/2013
EP 1046723 10/2000
(Continued)

OTHER PUBLICATIONS

Chinesee Office Action—Chinese Application No. 201580069613.3 dated Nov. 1, 2018, citing CN 103476959.
(Continued)

*Primary Examiner* — Anthony J Zimmer
*Assistant Examiner* — Ricardo D Morales
(74) *Attorney, Agent, or Firm* — Cantor Colburn LLP

(57) ABSTRACT

Provided is an austenitic stainless steel for a fuel cell including, in weight %, C: 0.05% to 0.09%, Si: 0.5% or less (0 excluded), Mn: 2.5% to 5.0%, Cr: 21% to 23%, Ni: 10% to 12%, Nb: 0.2% to 0.7%, N: 0.25% or less (0 excluded), Al: 0.2% or less (0 excluded), S: 0.003% or less (0 excluded), B: 0.01% or less (0 excluded), the remainder being Fe and unavoidable impurities.

5 Claims, 11 Drawing Sheets

(51) Int. Cl.
*C22C 38/00* (2006.01)
*C22C 38/02* (2006.01)
*C22C 38/54* (2006.01)
*H01M 8/021* (2016.01)
*H01M 8/14* (2006.01)

(52) U.S. Cl.
CPC ............. *C22C 38/54* (2013.01); *H01M 8/021* (2013.01); *H01M 2008/147* (2013.01); *Y02E 60/526* (2013.01)

(56) References Cited

FOREIGN PATENT DOCUMENTS

| | | | | |
|---|---|---|---|---|
| EP | 2299526 | 3/2011 | | |
| EP | 2692886 | 2/2014 | | |
| EP | 2692886 A1 * | 2/2014 | ........... | C22C 38/001 |
| JP | 10237599 | 9/1998 | | |
| JP | 2932211 | 8/1999 | | |
| JP | 2005340163 | 12/2005 | | |
| JP | 2009007627 | 1/2009 | | |
| JP | 2009120950 | 6/2009 | | |
| JP | 2013117039 | 6/2013 | | |
| JP | 2013133533 | 7/2013 | | |
| KR | 100259213 | 6/2000 | | |
| KR | 100435420 | 6/2004 | | |
| KR | 20080089266 | 10/2008 | | |
| KR | 101311784 | 9/2013 | | |
| KR | 101412893 | 6/2014 | | |
| WO | 2012132992 | 10/2012 | | |
| WO | 2015159554 | 10/2015 | | |
| WO | 2016068009 | 5/2016 | | |

OTHER PUBLICATIONS

International Search Report—PCT/KR2015/014087 dated Apr. 1, 2016.
European Search Report—European Application No. 15873606.6 dated Apr. 16, 2018, citing EP 2 692 886, US 5 565 167, JP 2 932211, EP 1 046 723 and EP 2 299 526.
Chinese Notice of Allowance—Chinese Application No. 201580069613.3 dated Mar. 26, 2019.

* cited by examiner

AUSTENITIC-BASED STAINLESS STEEL FOR MOLTEN CARBONATE FUEL CELL

TECHNICAL FIELD

The present disclosure relates to austenitic stainless steel for a fuel cell, and in particular, to austenitic stainless steel for a fuel cell capable of being used as a structural member in a molten carbonate fuel cell (MCFC).

BACKGROUND ART

A molten carbonate fuel cell (MCFC) is a highly efficient and environmental-friendly power generating device. Main constituents of a molten carbonate fuel cell include an anode and a cathode where an electrochemical reaction occurs, a matrix including a carbonate electrolyte, a current collector for electricity collection and gas distribution, and a separator for electrical conduction and gas inflow and outflow, and the like. As the anode current collector, nickel, a nickel alloy, STS 310S or the like stable under an anode environment is used. As the cathode current collector, 316L is used, and as the separator, 316L or 310S is used. The electrolyte is generally present in a molten state at 650° C., an operating temperature of a molten carbonate fuel cell. The current collector and the separator have a problem of facing a risk of corrosion by being exposed to the molten carbonate of 650° C. and gas generated from the anode and the cathode. When corrosion occurs in the current collector and the separator as above, non-conductive corrosion products having high resistance are formed on the stainless steel surface causing an increase in the resistance and an electrolyte loss, which induces a decline in the whole fuel cell performance. Particularly, the STS 316L material currently use as a cathode current collector material of a molten carbonate fuel cell has an advantage of exhibiting excellent electrical conductivity, but has a fatal disadvantage of inducing cell performance decline when used for a long period of time due to a rapid corrosion product increase caused by relatively low corrosion resistance.

As methods of solving a corrosion problem of stainless steel in a molten carbonate fuel cell, methods of applying anti-corrosion coating on a stainless steel surface are disclosed in a method of processing a separator of a molten carbonate-type fuel cell (Korean Patent No. 10-0259213 (2000 Mar. 20)), a coating method of anti-corrosion for a separator of a molten carbonate fuel cell (Korean Patent No. 10-1311784 (2013 Sep. 13)), and a separator for a molten carbonate fuel cell (Korean Patent No. 10-0435420 (2004 Jun. 1)) disclosed in the art.

However, the method of enhancing corrosion resistance by coating nickel or aluminum on a stainless steel surface also has problems although it may facilitate enhancement in the corrosion resistance itself. For example, when forming a nickel coating portion, corrosion resistance may decrease due to a carburizing phenomenon forming carbides on the nickel coating portion, and when forming an aluminum coating portion, aluminum oxide is formed causing a problem of decreasing contact resistance, and the like.

In addition, the method of enhancing corrosion resistance by coating TiN on a part where a separator and an electrode are brought into contact with each other, and coating Ni again thereon may not control conductivity of corrosion products themselves formed on a stainless steel surface, and separator manufacturing costs increase due to additional costs required by the coating.

Accordingly, new stainles steel capable of maintaining high conductivity and corrosion resistance while not including a separate coating process has been required.

DISCLOSURE

Technical Problem

The present disclosure has been made in view of the above, and the present disclosure is directed to providing austenitic stainless steel for a fuel cell maintaining contact resistance at a certain level or lower under a high temperature environment.

Technical Solution

In view of the above, austenitic stainless steel for a fuel cell according to one embodiment of the present disclosure includes, in weight %, C: 0.05% to 0.09%, Si: 0.5% or less (0 excluded), Mn: 2.5% to 5.0%, Cr: 21% to 23%, Ni: 10% to 12%, Nb: 0.2% to 0.7%, N: 0.25% or less (0 excluded), Al: 0.2% or less (0 excluded), S: 0.003% or less (0 excluded), B: 0.01% or less (0 excluded), the remainder being Fe and unavoidable impurities.

When the austenitic stainless steel for a fuel cell is exposed for 2,000 hours under a 650° C. molten carbonate environment, a scale having contact resistance of 80 mΩ*cm$^2$ or less is formed on a surface thereof.

The scale includes Cr oxide and Mn oxide.

The Cr oxide includes a Cr—Mn—O spinel phase, and the Mn oxide includes a Cr—Mn—O spinel phase and an Fe—Mn—O spinel phase.

Nb is doped to the Mn oxide.

Advantageous Effects

Austenitic stainless steel for a fuel cell according to the present disclosure has effects as follows.

First, corrosion resistance can be secured under a high temperature molten carbonate environment.

Second, high electrical conductivity can be secured by forming a scale including manganese oxide.

Third, an electrical conductivity decrease can be prevented by suppressing Si and Al oxides.

MODE FOR DISCLOSURE

Figure 1A:
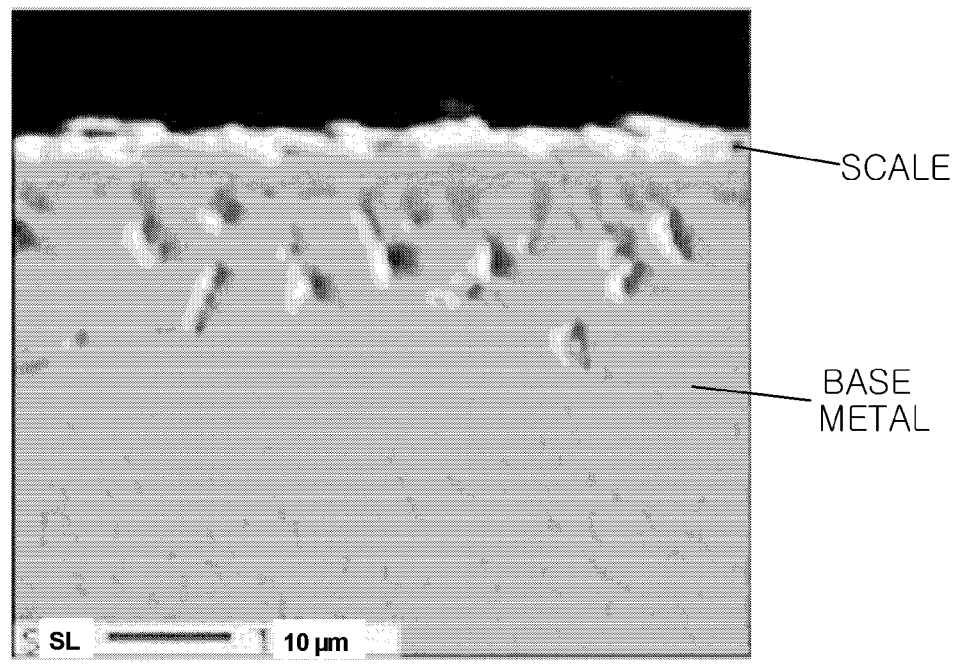
FIG. 1a is a photograph showing a scale formed in a base metal according to one example of the present disclosure.

The terminology used herein is for describing particular embodiments only and is not intended to limit the present disclosure. Singular forms used herein include plural forms as well, unless the context clearly indicates otherwise. The meaning of "include" used in the specification specify particular features, areas, integers, steps, operations, elements and/or components, and do not preclude the presence or addition of other particular features, areas, integers, steps, operations, elements, components and/or groups.

Unless otherwise specified, all the terms including technical terms and scientific terms used herein have the same meanings commonly understandable to those skilled in the art relating to the present disclosure. Terms defined in generally used dictionaries are additionally interpreted to have meanings corresponding to relating technical literatures and contents currently disclosed, and are not interpreted either ideally or very formally unless defined otherwise.

Hereinafter, austenitic stainless steel for a fuel cell according to preferred embodiments of the present disclosure will be described with reference to the accompanying drawings.

The present disclosure relates to austenitic stainless steel including C: 0.05% to 0.09%, Si: 0.5% or less (0 excluded), Mn: 2.5% to 5.0%, Cr: 21% to 23%, Ni: 10% to 12%, Nb: 0.2% to 0.7%, N: 0.25% or less (0 excluded), Al: 0.2% or less (0 excluded), S: 0.003% or less (0 excluded), B: 0.01% or less (0 excluded) (hereinbefore, weight %), the remainder being Fe and unavoidable impurities.

Hereinafter, reasons for numerically limiting each component will be described. Moreover, the following % all means weight %.

C: C is effective in increasing material strength by solid solution strengthening and is an essential element for manufacturing stainless steel. In order to exhibit such a property, a minimum content of 0.05% is required. However, when added in excess, carbides are form by reacting with elements such as Cr effective in corrosion resistance, and the Cr content around a grain boundary forming such carbides decreases resultantly decreasing corrosion resistance. Accordingly, the content is preferably limited to 0.09% or less for maximizing corrosion resistance.

Si: Si is used as a deoxidizer when manufacturing stainless steel, and when formed as an oxide, may enhance corrosion resistance. However, when added in excess, electrical conductivity may decrease, and therefore, limiting the content to 0.5% or less is preferred.

Mn: Mn is an austenite-stabilizing element capable of replacing Ni, and Mn oxide formed inside a scale generated under a high temperature oxidizing environment enhances electrical conductivity by forming a spinel phase with Fe and Cr oxides. However, when added in excess, corrosion resistance may decrease on the contrary, and therefore, limiting the Mn content to 2.5% to 5% is preferred.

Cr: Cr is an alloy element absolutely required for enhancing corrosion resistance and oxidation resistance in stainless steel, and corrosion resistance increases as the Cr content increases. However, Cr is a ferrite-stabilizing element, and therefore, the content of high-priced Ni needs to be increased with the Cr increase in order to stabilize an austenite phase, and it becomes a reason for raising production costs of steel. Accordingly, limiting the Cr content to 21% to 23% is preferred for securing corrosion resistance of STS 316L or higher while maintaining the austenite phase fraction.

Ni: Ni is an element stabilizing the austenite phase together with Mn and N, and for cost reduction, increasing the content of Mn and N while decreasing the content of high-priced Ni is preferred. However, when decreasing the Ni content in excess, corrosion resistance and hot working may be reduced due to N excessively added for replacing Ni, and corrosion resistance may not be secured due to a decrease in the Cr content accompanying a decrease in the Ni content, and therefore, limiting the Ni content to 10% to 12% is preferred.

Nb: Nb is an element effective in enhancing high temperature strength and creep strength, and may enhance electrical conductivity by being doped into Mn oxide. However, when the content is in excess, grains are refined and therefore, hot working is reduced. Accordingly, limiting the Nb content to 0.2% to 0.7% is preferred.

N: N is an austenite-stabilizing element enhancing both high temperature strength and corrosion resistance. However, adding Ni in excess reduces hot working and causes defects such as pores, and therefore, limiting the content to 0.25% or less is preferred.

B: B is an alloy element enhancing hot working at high temperatures, and adding B in excess inhibits ductility, toughness and working, and therefore, limiting the content to 0.01% or less is preferred.

Al: Al is an element capable of controlling grain particle sizes and used as a deoxidizer. However, when added in excess, non-conductive Al oxide is formed on the steel surface under a high temperature molten carbonate environment increasing an electric resistance value, and therefore, the content is preferably limited to 0.2% or less.

S: S is a trace impurity element, and is a major reason causing process cracks during hot rolling by being segregated to the grain boundary, and therefore, the content is limited to possibly the lowest, preferably 0.003% or less.

When the austenitic stainless steel for a fuel cell according to the present disclosure is exposed for 2,000 hours under a 650° C. molten carbonate environment, a scale having contact resistance of 80 m$\Omega$*cm$^2$ or less is preferably formed on the surface.

In order to be used as a structural member of such a fuel cell, corrosion resistance and a low contact resistance value need to be maintained for a long period of time at 650° C., an operating temperature of a molten carbonate fuel cell. As to be described later, the present disclosure has attempted to overcome such a problem by including manganese oxide having low contact resistance in the scale formed on the surface.

The scale preferably includes Cr oxide and Mn oxide.

Cr oxide is an essential element for exhibiting corrosion resistance, but is not able to be used as a structural member of a fuel cell by itself due to its low electrical conductivity. Accordingly, by forming Mn oxide having high electrical conductivity therewith and applying a current therethrough, Cr oxide is able to be used as a structural member of a fuel cell.

The Cr oxide preferably includes a Cr—Mn—O spinel phase, and the Mn oxide preferably includes a Cr—Mn—O spinel phase and an Fe—Mn—O spinel phase.

A spinel phase readily exhibits ferromagnetism due to its structural property. Accordingly, by forming $Fe_2MnO_4$ substituting one Fe atom with Mn in a spinel phase such as $Fe_3O_4$, or forming a spinel phase such as $[Mn^{2+}, Cr^{2+}](Cr^{3+}, Mn^{3+})_2O_4$, both high corrosion resistance and high electrical conductivity are obtained.

Nb is preferably doped to the Mn oxide. This is due to the fact that Nb-doped Mn oxide exhibits higher electrical conductivity, which is helpful in forming a scale having high electrical conductivity that the present disclosure pursues. For this, 0.2% to 0.7% of Nb, a composition range of the present disclosure, is added.

other words, manganese oxide having high electrical conductivity is less formed, and non-conductive chromium and aluminum oxides are more produced resultantly exhibiting high contact resistance.

Meanwhile, Examples 1, 2 and 3 had lower contact resistance values compared to 316L despite a higher Cr content compared to 316L. This is due to the fact that Mn much included in the steel is oxidized and distributed in the scale. While Mn oxide is formed, the Mn oxide forms a highly conductive spinel phase (Fe—Mn—O or Cr—Mn—O) together with Fe or Cr. Particularly, Example 2 exhibited lower contact resistance compared to Example 1, and this is due to the fact that contact resistance decreases by Nb doping in the Mn oxide caused by the high Nb content.

FIGS. 1a to 1e and FIGS. 2a to 2e show results of EMPA analyses showing distribution of major alloy elements in the scale of the example and the comparative example. FIGS. 1a to 1e analyze the scale of Example 1 and FIGS. 2a to 2e

TABLE 1

|  | C % | Si % | Mn % | Cr % | Ni % | Mo % | Nb % | B % | N % | Al % | Contact Resistance mΩ * cm² |
| --- | --- | --- | --- | --- | --- | --- | --- | --- | --- | --- | --- |
| 316L | 0.029 | 0.45 | 0.97 | 18.86 | 9.1 | 1.98 | — | — | 0.042 |  | 89.3 |
| 310S | 0.04 | 0.44 | 1.35 | 24.51 | 19.7 | — | — | — | 0.031 |  | 174.7 |
| Comparative Example 1 | 0.052 | 0.51 | 0.49 | 21.54 | 11.1 | — | 0.2 | 0.003 | 0.175 |  | 118.2 |
| Comparative Example 2 | 0.049 | 0.55 | 0.47 | 21.67 | 11.07 | — | 0.21 | 0.003 | 0.168 | 0.41 | 135.5 |
| Example 1 | 0.051 | 0.33 | 3.01 | 21.89 | 11.18 | — | 0.21 | 0.003 | 0.172 | — | 76.4 |
| Example 2 | 0.053 | 0.27 | 2.95 | 22.1 | 11.01 | — | 0.48 | 0.003 | 0.162 | — | 67.2 |
| Example 3 | 0.058 | 0.24 | 4.89 | 22.26 | 11.15 | — | 0.19 | 0.003 | 0.167 | — | 73.8 |

In the present disclosure, in order for obtaining austenitic stainless steel for a molten carbonate fuel cell having excellent corrosion resistance and electrical conductivity, contact resistance of each example and comparative example was measured while varying the amounts of the various alloy elements added. Contact resistance means a resistance value between the scale produced in the steel used in the tests and a NiO cathode, and this value is proportional to an electric resistance value of the scale.

Table 1 shows alloy compositions for the test steel types and results of measuring contact resistance. As the test method, each of the test steel types was exposed for 2,000 hours under a 650° C. molten carbonate environment, and then electrical conductivity of the scale formed on the surface was measured. Steel having a higher electrical conductivity value compared to STS 316L may be determined as poor, and steel having a lower electrical conductivity value compared to STS 316L may be determined as favorable in the comparative examples and the examples. The examples were with austenitic stainless steel within the composition range of the present disclosure, and the comparative examples were with austenitic stainless steel that were outside the composition range of the present disclosure.

According to Table 1, the contact resistance value of 310S was higher than the contact resistance value of 316L currently used as a cathode current collector of a molten carbonate fuel cell. This is due to the fact that 310S has a higher Cr amount compared to 316L, and more non-conductive Cr oxide is formed in the scale.

The contact resistance values of Comparative Examples 1 and 2 were high compared to 316L, and this is due to a higher content of Cr and Al, and a lower content of Mn. In analyze the scale of Comparative Example 1, which are produced on the surface after exposing the stainless steel for 2,000 hours under a 650° C. molten carbonate environment.

Figure 1B:
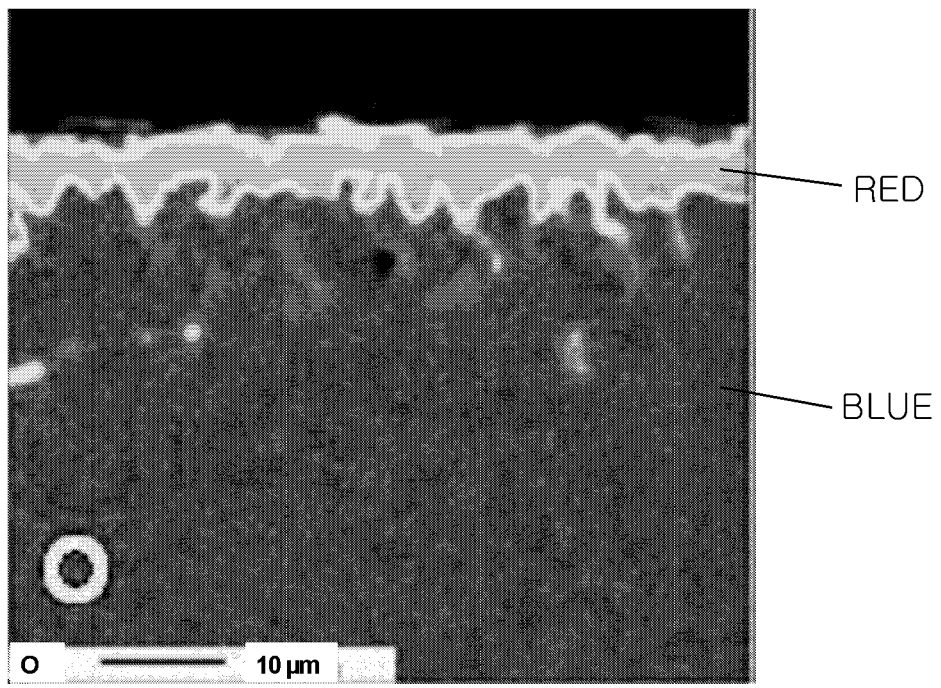
FIG. 1b is an EPMA-analyzed photograph showing a concentration of O included in a base metal and a scale according to one example of the present disclosure.
Figure 2A:
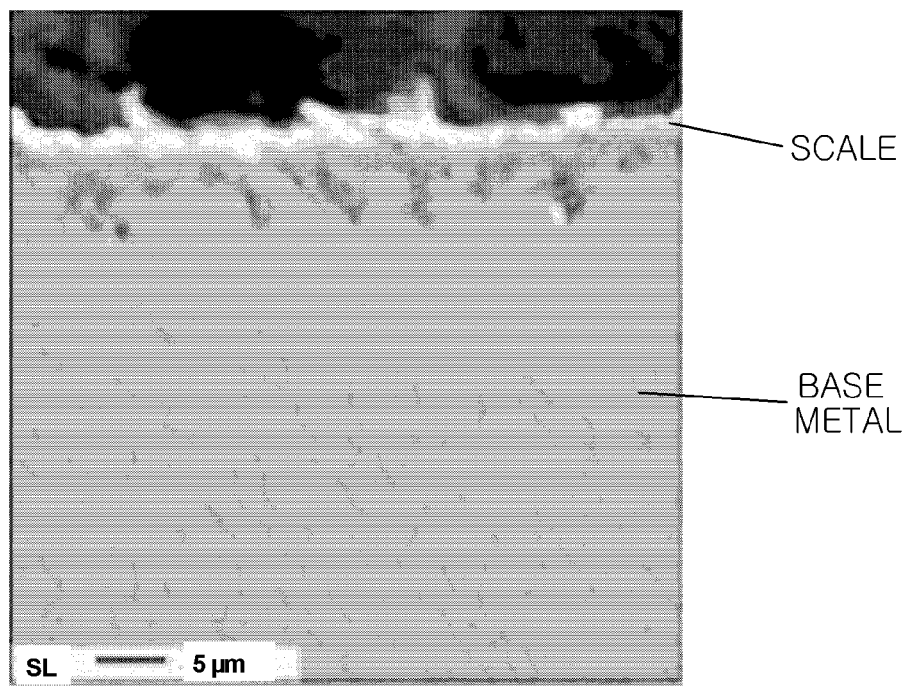
FIG. 2a is a photograph showing a scale formed in a base metal according to a comparative example.
Figure 2B:
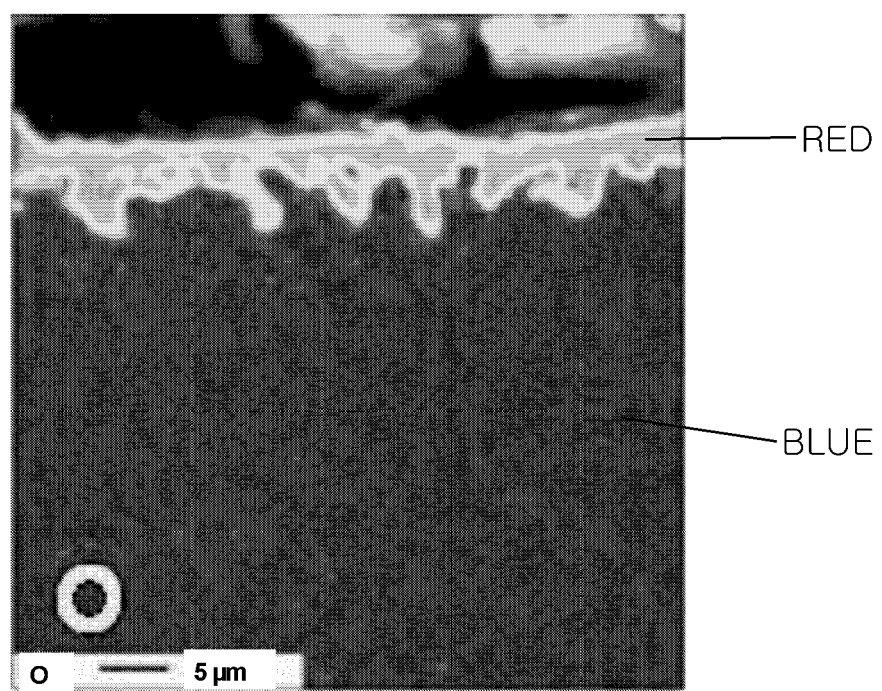
FIG. 2b is an EPMA-analyzed photograph showing a concentration of O included in a base metal and a scale according to a comparative example.

In each of the EPMA analyzed photographs, FIGS. 1a and 2a are pictures of a section of the scale-formed base metal using an electron microscope, and FIGS. 1b and 2b are pictures showing O content at the corresponding locations of FIGS. 1a and 2a.

Blue represents the corresponding element being rare, and red represents the corresponding element being abundant. The amount is understood to gradually increase from blue, green, yellow, orange and red.

Figure 1C:
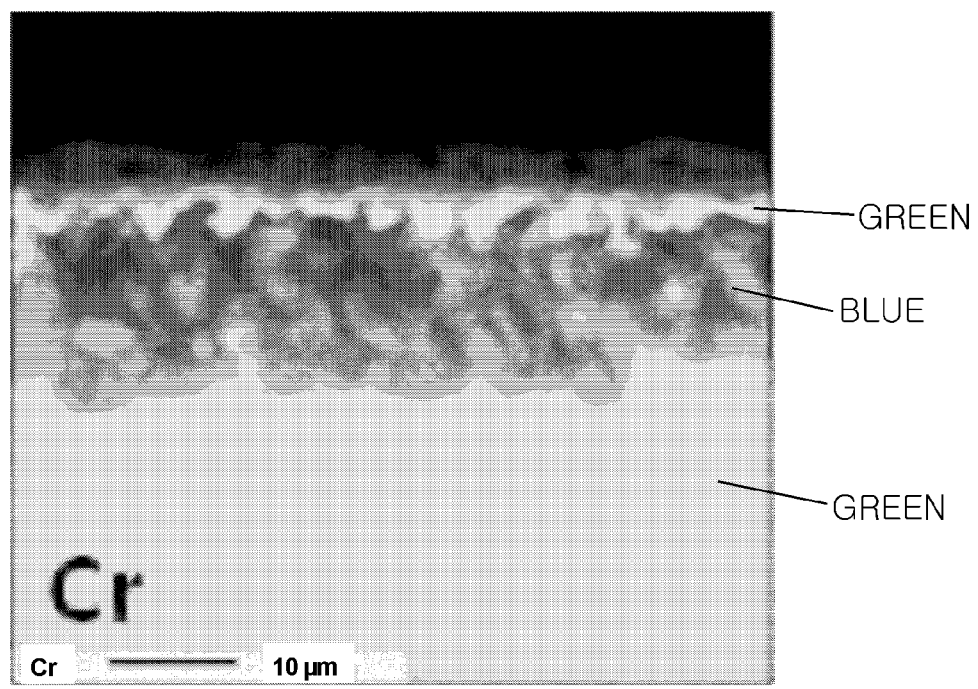
FIG. 1c is an EPMA-analyzed photograph showing a concentration of Cr included in a base metal and a scale according to one example of the present disclosure.
Figure 1D:
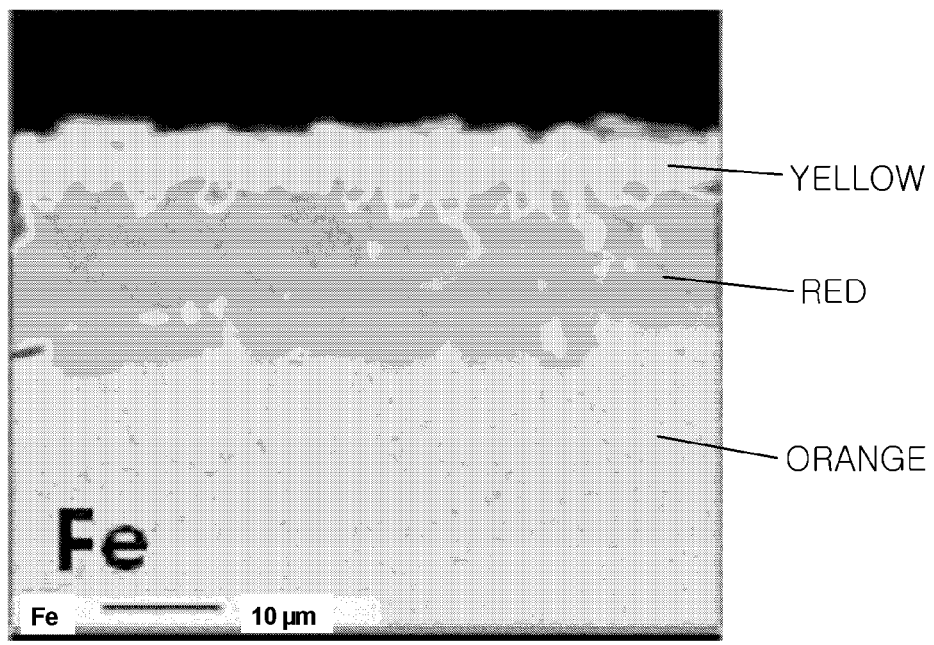
FIG. 1d is an EPMA-analyzed photograph showing a concentration of F included in a base metal and a scale according to one example of the present disclosure.
Figure 1E:
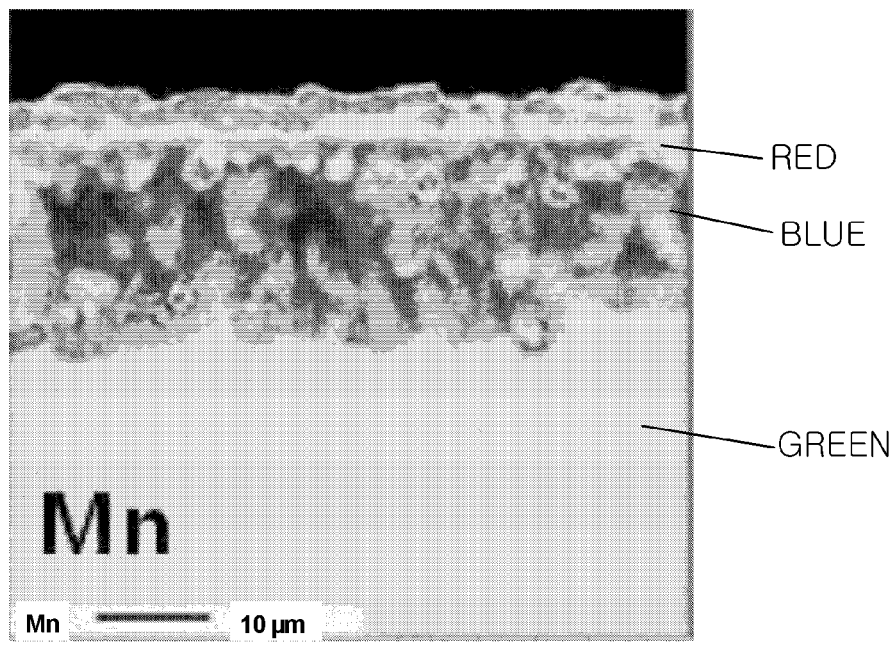
FIG. 1e is an EPMA-analyzed photograph showing a concentration of Mn included in a base metal and a scale according to one example of the present disclosure.
Figure 2C:
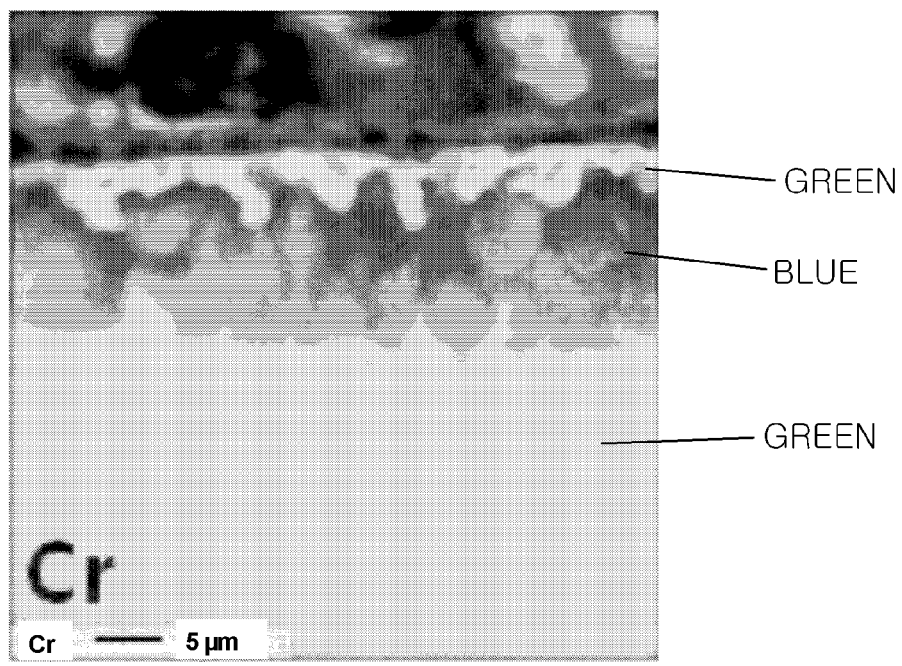
FIG. 2c is an EPMA-analyzed photograph showing a concentration of Cr included in a base metal and a scale according to a comparative example.
Figure 2D:
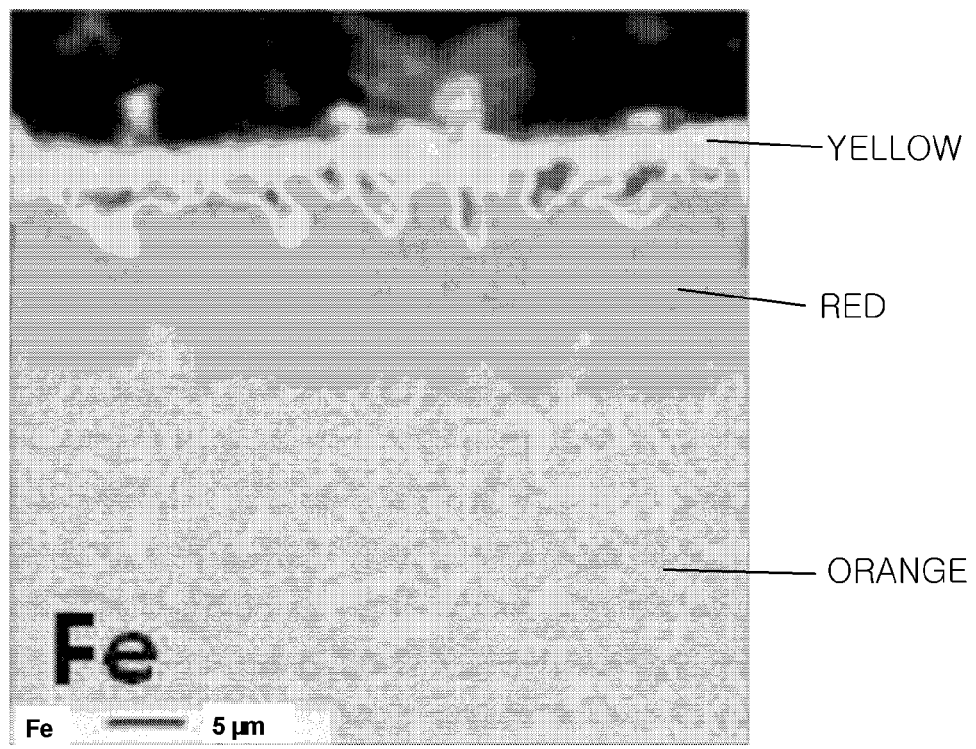
FIG. 2d is an EPMA-analyzed photograph showing a concentration of F included in a base metal and a scale according to a comparative example.
Figure 2E:
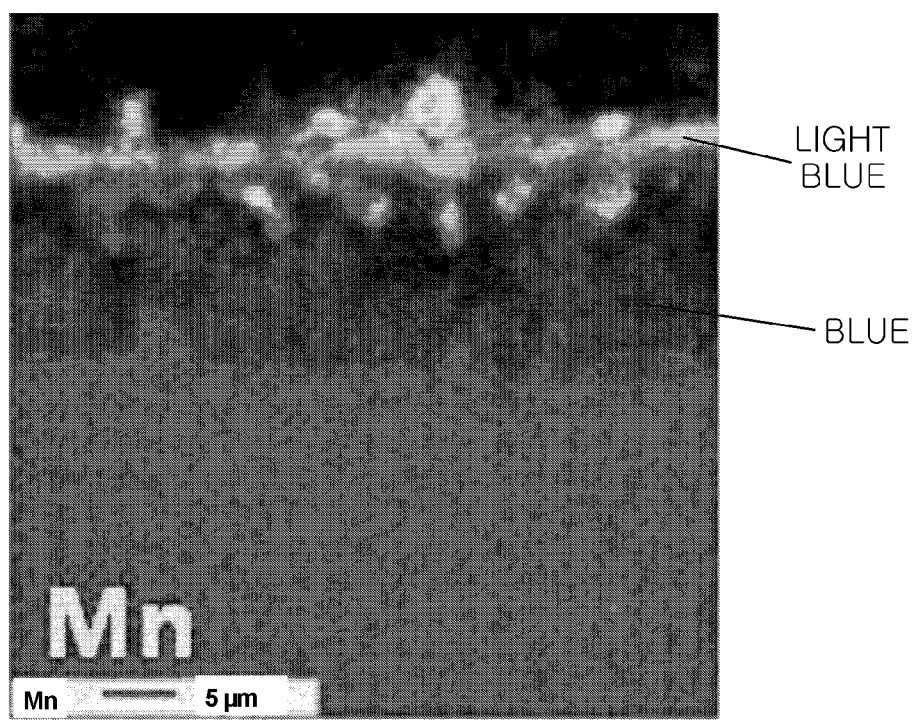
FIG. 2e is an EPMA-analyzed photograph showing a concentration of Mn included in a base metal and a scale according to a comparative example.

In the same manner, FIGS. 1c and 2c show the content of Cr, FIGS. 1d and 2d show the content of Fe, and FIGS. 1e and 2e show the content of Mn.

As shown in FIGS. 1a to 1e, Mn of Example 1 was sufficiently present in the oxide form in the scale (upper surface in the photograph), and the location was the same as the location of Fe or Cr. Accordingly, it was seen that Mn of Example 1 formed a complex spinel phase in the scale by bonding to Fe or Cr. Accordingly, a contact resistance value lower than 316L was obtained despite a high Cr content.

However, it was seen that, in Comparative Example 1 shown in FIGS. 2a to 2e, Cr and Fe were present in the scale, however, the Mn concentration was not sufficient. Contact resistance increased since Mn oxide was not formed inside the scale.

Figure 3:
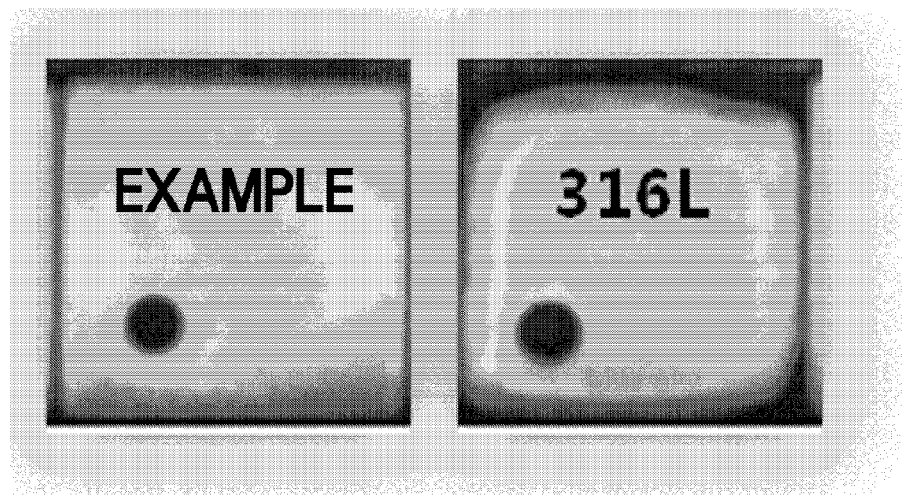
FIG. 3 shows pictures comparing corroded states of surfaces of an example of the present disclosure and existing 316L steel after immersing these for 300 hours in a 650° C. molten carbonate.

As shown in FIG. 3, a difference in the corrosion resistance between the present disclosure and existing steel definitely revealed in the photographs of the sample after removing all of the scale produced on the surface after immersing each of 316L and Example 1 for 300 hours in a 650° C. molten carbonate. It was seen that 316L was dissolved in the molten carbonate during immersion and the volume decreased, however, Example 1 experienced almost no volume changes, which indicated that corrosion resistance was enhanced compared to 316L. This is due to a higher Cr content of Example 1 compared to 316L. Corrosion resistance is enhanced by protecting a matrix structure of the steel by Cr oxide formed on the steel surface under a high temperature molten carbonate environment. However, electrical conductivity decreased in existing technologies since only Cr oxide was present, and in the present disclosure, an electrical conductivity decrease is capable of being prevented by forming Mn oxide as well.

Accordingly, Examples 1, 2 and 3 secure more superior electrical conductivity as well as higher corrosion resistance compared to 316L.

Hereinbefore, embodiments of the present disclosure have been described with reference to the accompanying drawings, however, it is to be understood that those having common knowledge in the art to which the present disclosure belongs may implement the present disclosure in other specific forms without modifying technological ideas or essential characteristics of the present disclosure.

Therefore, embodiments described above need to be understood as illustrative rather than limitative in all aspects. The scope of the present disclosure is represented by the attached claims rather than the detailed descriptions provided above, and the meaning and the scope of the claims, and all modifications or modified formed deduced from equivalent concepts thereof need to be interpreted as being included in the scope of the present disclosure.

The invention claimed is:

1. Austenitic stainless steel for a molten carbonate fuel cell comprising, in weight %, C: 0.05% to 0.09%, Si: 0.5% or less (0 excluded), Mn: 2.5% to 5.0%, Cr: 21% to 23%, Ni: 10% to 12%, Nb: 0.2% to 0.7%, N: 0.25% or less (0 excluded), Al: 0.2% or less (0 excluded), S: 0.003% or less (0 excluded), B: 0.01% or less (0 excluded), the remainder being Fe and unavoidable impurities, and a scale formed on a surface of the austenitic stainless steel, the scale having a contact resistance of 80 $m\Omega*cm^2$ or less.

2. The austenitic stainless steel for a molten carbonate fuel cell of claim 1, wherein the scale includes Cr oxide and Mn oxide.

3. The austenitic stainless steel for a molten carbonate fuel cell of claim 2, wherein the Cr oxide includes a Cr—Mn—O spinel phase, and the Mn oxide includes a Cr—Mn—O spinel phase and an Fe—Mn—O spinel phase.

4. The austenitic stainless steel for a molten carbonate fuel cell of claim 2, wherein Nb is doped to the Mn oxide.

5. The austenitic stainless steel for a molten carbonate fuel cell of claim 3, wherein Nb is doped to the Mn oxide.

* * * * *